(12) United States Patent
Berry et al.

(10) Patent No.: US 9,150,215 B2
(45) Date of Patent: Oct. 6, 2015

(54) HYBRID ELECTRIC VEHICLE AND METHOD OF CONTROL THEREOF

(75) Inventors: Adrian Berry, Warwickshire (GB);
Timothy Holton, Warwickshire (GB);
Elliot Hemes, Warwickshire (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/113,967

(22) PCT Filed: Apr. 30, 2012

(86) PCT No.: PCT/EP2012/057936
§ 371 (c)(1),
(2), (4) Date: Oct. 25, 2013

(87) PCT Pub. No.: WO2012/152613
PCT Pub. Date: Nov. 15, 2012

(65) Prior Publication Data
US 2014/0051545 A1    Feb. 20, 2014

(30) Foreign Application Priority Data
Apr. 28, 2011   (GB) .................................. 1107102.4

(51) Int. Cl.
| G06F 17/00 | (2006.01) |
| B60W 20/00 | (2006.01) |
| B60K 6/48 | (2007.10) |
| B60K 6/52 | (2007.10) |
| B60W 30/182 | (2012.01) |
| B60W 50/08 | (2012.01) |

(52) U.S. Cl.
CPC .................. *B60W 20/10* (2013.01); *B60K 6/48* (2013.01); *B60K 6/52* (2013.01); *B60W 20/102* (2013.01); *B60W 30/182* (2013.01); *B60W 50/082* (2013.01); *Y02T 10/6221* (2013.01); *Y02T 10/6265* (2013.01); *Y10S 903/93* (2013.01); *Y10T 477/23* (2015.01)

(58) Field of Classification Search
None
See application file for complete search history.

(56) References Cited

U.S. PATENT DOCUMENTS

| 8,376,904 B2* | 2/2013 | Eisele .............................. 477/3 |
| 2009/0145673 A1* | 6/2009 | Soliman et al. .............. 180/65.1 |

(Continued)

FOREIGN PATENT DOCUMENTS

| EP | 1580058 A2 | 9/2005 |
| EP | 2133252 A1 | 12/2009 |

(Continued)

OTHER PUBLICATIONS

International Search Report for International application No. PCT/EP2012/057936 dated Jul. 30, 2012.

*Primary Examiner* — Dirk Wright
(74) *Attorney, Agent, or Firm* — Myers Bigel Sibley & Sajovec

(57) ABSTRACT

A hybrid electric vehicle comprises an engine and an electric propulsion motor, and the vehicle is operable in an HEV mode in which the engine may be switched on automatically during a drive-cycle by a controller and an electric vehicle (EV)-only mode. The vehicle is operable in a plurality of attribute modes in which operating parameters of the vehicle are changed by the controller responsive to the identity of the selected attribute mode, wherein, when in the HEV mode and a first attribute mode is selected, selection of the EV-only mode by the driver results in assumption of the EV-only mode and continued operation in the first attribute mode, and, when in the HEV mode and a second attribute mode is selected, selection of the EV-only mode results in assumption of the EV-only mode and automatic de-selection of the second attribute mode.

19 Claims, 2 Drawing Sheets

(56) References Cited

U.S. PATENT DOCUMENTS

2009/0287366 A1 11/2009 Davis et al.
2011/0077813 A1* 3/2011 Hadsell et al. .................. 701/26

FOREIGN PATENT DOCUMENTS

| | | |
|---|---|---|
| GB | 2473294 A | 3/2011 |
| JP | 2006-321488 A | 11/2006 |

* cited by examiner

|  |  | Hybrid Vehicle | | |
|---|---|---|---|---|
|  |  | Normal Hybrid Mode | Selectable EV Mode | Hybrid Inhibit Mode |
| Terrain Response Special Programs User-Selected | Special Programs Off | • Engine shutdown whenever possible.<br>• Engine restart strategy based on:-<br>  - Accelerator pedal demand.<br>  - Battery state of charge.<br>  - Hybrid inhibits. | • HMI has more focus on running in EV mode:-<br>  - Lower speed focus.<br>  - Battery state of charge. | • Engine shutdown inhibited |
|  | Dynamic | As normal hybrid functionality but engine shutdown is inhibited by default. | *EV button selects EV and turns off TR special programs* | • Engine shutdown inhibited (default status following mode selection) |
|  | Grass Gravel Snow | No Change (Normal hybrid functionality) | Not allowed | No change (hybrid inhibit is allowed) |
|  | Mud and Ruts | No Change (Normal hybrid functionality) | Not allowed | No change (hybrid inhibit is allowed) |
|  | Sand | No Change (Normal hybrid functionality) | Not allowed | No change (hybrid inhibit is allowed) |
|  | Rock Crawl | No Change (Normal hybrid functionality) | Not allowed | No change (hybrid inhibit is allowed) |
| Terrain Response Special Programs Auto-Selected | Special Programs OFF | No Change (Normal hybrid functionality) | SEV allowed | No change (hybrid inhibit is allowed) |
|  | Grass Gravel Snow | No Change (Normal hybrid functionality) | Not allowed | No change (hybrid inhibit is allowed) |
|  | Mud and Ruts | No Change (Normal hybrid functionality) | Not allowed | No change (hybrid inhibit is allowed) |
|  | Sand | No Change (Normal hybrid functionality) | Not allowed | No change (hybrid inhibit is allowed) |
|  | Rock Crawl | No Change (Normal hybrid functionality) | Not allowed | No change (hybrid inhibit is allowed) |

*TR forced to SPO (General Program) with HMI. Stays in SPO when EV turns off.*

Figure 2

HYBRID ELECTRIC VEHICLE AND METHOD OF CONTROL THEREOF

FIELD OF THE INVENTION

The present invention relates to a controller and to a method of controlling a hybrid electric vehicle (HEV). In particular but not exclusively the invention relates to a controller and a method of controlling a parallel-type HEV. Aspects of the invention relate to a control system, to a vehicle and to a method.

BACKGROUND

It is known to provide a parallel-type hybrid electric vehicle (PHEV) having an electric machine and an internal combustion engine (ICE) connected in parallel to a driveline of the vehicle.

The vehicle may be configured to operate in a parallel HEV mode in which torque to the driveline is provided by an internal combustion engine and an electric machine according to a required torque split between the engine and electric machine. Depending on a state of charge (SoC) of a battery of the vehicle and one or more other vehicle parameters the vehicle may be configured to turn the engine off and supply all of the required torque by means of the electric machine (known as operating in electric-vehicle or 'EV' mode), or to turn the engine on and supply a proportion of the torque from both the engine and the electric machine. When it is required to charge the battery, the engine may be configured to provide torque to drive the driveline and to power the electric machine as a generator.

The vehicle may also be provided with an 'EV-only' mode selectable by a driver to inhibit starting of the engine and force the vehicle to be driven by the electric machine only.

STATEMENT OF THE INVENTION

According to one aspect of the invention for which protection is sought there is provided a hybrid electric vehicle (HEV) comprising:
  an engine and at least one electric propulsion motor, the vehicle being operable in a HEV mode in which the engine may be switched on automatically during a drive-cycle by control means and an electric vehicle (EV)-only mode in which engine starting is inhibited during a drive-cycle,
  the vehicle being operable in one of a plurality of attribute modes in which one or more operating parameters of the vehicle are changed responsive to the identity of the selected attribute mode, wherein
  when in the HEV mode and a first attribute mode is selected, selection of the EV-only mode by the driver results in assumption of the EV-only mode and continued operation in the first attribute mode, and
  when in the HEV mode and a second or further attribute mode has been selected, selection of the EV-only mode by the driver results in assumption of the EV-only mode and automatic de-selection by the vehicle of the second or further attribute mode.

The vehicle may be a parallel-type HEV in which the engine and electric propulsion motor are each operable to develop drive torque or a series-type HEV in which only the electric propulsion motor is operable to develop drive torque. In either case the engine may be operable to generate charge to power the propulsion motor. The charge may also be used to recharge a charge storage device such as a battery for powering the propulsion motor. The propulsion motor may comprise an electric machine operable as a generator for generating charge for storage.

It is to be understood that embodiments of the present invention have the feature that if the vehicle is in the HEV mode and the first attribute mode is selected (which may be a default attribute mode or 'base' attribute mode), if the driver subsequently selects the EV-only mode of operation the vehicle assumes the EV-only mode and continues to operate in the first attribute mode.

However, if the vehicle is in the HEV mode and the second or further attribute mode has been assumed, if the driver selects the EV-only mode the vehicle is arranged automatically to de-select (or 'cancel') the second or further attribute mode.

This feature has the advantage that when the EV-only mode is assumed the vehicle may assume an attribute mode that is appropriate to operation in EV-only mode regardless of the attribute mode that was selected when the vehicle was in the HEV mode.

It is to be understood that a driver may select a second or further attribute mode other than the first attribute mode during operation in HEV mode. For example, the driver may select an attribute mode suitable for operation on a grassy surface whilst operating on such a surface. In this attribute mode the vehicle may be arranged to change a response of the engine to accelerator or throttle pedal input.

Thus it is to be understood that a given attribute mode may have a prescribed set of data associated therewith responsive to which the vehicle is arranged to control an amount of power developed by the engine and/or at least one electric machine. Alternatively or in addition the vehicle may be arranged to control the speed of the engine and/or electric machine, and/or an amount of torque developed by one or more of them.

For example the data may include one or more throttle maps from which data in respect of the amount of power to be developed by the engine, the amount of torque and/or a speed of the engine may be determined by the vehicle for a given amount of depression of a throttle or accelerator pedal of the vehicle. A different throttle map may be provided for operation of the vehicle in one or more different gears of a transmission of the vehicle.

In addition or instead a given attribute mode may have a prescribed set of data associated therewith responsive to which the vehicle may be arranged to control the vehicle to shift up a gear or down a gear responsive to a speed of the vehicle and/or a speed of the engine or at least one electric machine.

In some arrangements the prescribed set of data may comprise one or more gear shift maps. The gear shift map(s) may be employed to determine when the transmission is required to shift up a gear or shift down a gear.

Further additionally or instead, a given attribute mode may have a prescribed set of data associated therewith arranged to change an operating parameter of a suspension of the vehicle, such as an amount of deflection or travel of the suspension as a function of time for a given force applied to the suspension. Other arrangements are also useful.

For example, when in the second or a further attribute mode the vehicle may be arranged to 'soften' the response of the engine (which may be an internal combustion engine) to throttle pedal inputs such that the engine speed or torque delivered by the engine for a given amount of throttle pedal depression is lower than when in the first attribute mode. In some attribute modes the vehicle may be arranged to 'harden' the response, whereby the engine speed or torque delivered by the engine for a given amount of throttle pedal depression is higher than when in the first attribute mode, for example in a mode appropriate to operation on sand.

Whilst in the HEV mode with the second or further attribute mode selected, the driver may select the EV-only mode, for example in order to reduce an amount noise generated by the vehicle due to running of the engine, or to prevent a sudden increase in noise due to starting of the engine. Such noise might be inappropriate in certain circumstances such as when observing wildlife.

It is to be understood that the 'EV-only' mode is not to be confused with an EV mode selected automatically by the vehicle when operating in HEV mode according to a given HEV control methodology. It is to be understood that in such a 'vehicle selected EV mode' the torque split between the engine and the at least one electric machine is such that the electric machine provides all of the required torque to drive the vehicle, allowing the engine to be switched off if appropriate.

By EV-only mode is meant EV mode when selected by the driver to force the engine to be switched off. Thus, if when in HEV mode the engine is on (for example in order to recharge the battery) and the driver selects EV-only mode, the vehicle may be configured to switch the engine off and allow operation in EV-only mode until one or more further prescribed conditions are met, at which time the vehicle may de-select EV-only mode, resume HEV mode and force an engine restart.

It is to be understood that in some embodiments one or more of the attribute modes such as one or more of the second or further attribute modes may be referred to as a 'terrain response' mode. This is because different attribute modes may be configured to be suitable for operation of the vehicle on different types of terrain as discussed in more detail below.

Advantageously the vehicle may be operable wherein when in the HEV mode and the second or further attribute mode has been assumed, selection of the EV-only mode by the driver results in assumption of the EV-only mode, automatic de-selection of the second or further attribute mode and assumption of the first attribute mode.

This feature has the advantage that if the vehicle has been operating in HEV mode in the second attribute mode and the driver has deliberately selected EV-only mode, when the EV-only mode is selected the vehicle may assume a base or default attribute mode.

Further advantageously the vehicle may be operable wherein when in the EV-only mode and the driver selects an attribute mode other than the first attribute mode the control means is arranged automatically to de-select the EV-only mode and to select the attribute mode selected by the driver.

This feature has the advantage that if a driver is operating in EV-only mode and it becomes apparent that an attribute mode other than the first attribute mode is more suitable, the driver may select the required attribute mode and allow the vehicle automatically to de-select EV-only mode without the driver having to take any further action.

The fact that EV-only mode is automatically de-selected and the engine no longer inhibited from starting also has the advantage in some embodiments that the vehicle is more likely to be able to meet a demand for torque made on the vehicle in the newly assumed attribute mode. It is to be understood that in some attribute modes the engine is arranged to be switched on and stopping of the engine inhibited.

Some embodiments of the invention therefore have the advantage that if the driver unexpectedly finds himself driving in snow or ice conditions in EV-only mode, the driver may select an attribute mode appropriate to the prevailing conditions and allow the vehicle automatically to de-select EV-only mode whilst he concentrates on driving the vehicle.

The vehicle may be operable wherein when in the EV-only mode and the driver selects the second or further attribute mode the control means is arranged automatically to de-select the EV-only mode, select the HEV mode and assume the attribute mode selected by the driver.

Advantageously the vehicle may be operable wherein when in the HEV mode and the second or further attribute mode has been selected, selection of the EV-only mode by the driver results in assumption of the EV-only mode and automatic de-selection by the control means of the second or further attribute mode, the vehicle being operable wherein subsequent de-selection of the EV-only mode results in continued de-selection of the second or further attribute mode.

Thus in some embodiments, when the driver de-selects the EV-only mode the vehicle continues operating in the first attribute mode. This feature has the advantage that the driver is not inconvenienced by a change in attribute mode to a previously selected attribute mode when EV-only mode is de-selected.

Optionally when in the HEV mode and a second or further attribute mode has been selected, selection of the EV-only mode by the driver results in assumption of the EV-only mode and automatic selection of the first attribute mode, the vehicle being operable wherein subsequent de-selection of the EV-only mode results in continued selection of the first attribute mode.

Thus, in some embodiments once EV-only mode is selected the vehicle is configured to exit the second or further attribute mode and assume the first attribute mode. However when EV-only mode is subsequently de-selected in favour of HEV mode, the vehicle remains in the first attribute mode. Thus if whilst in EV-only mode the driver has moved from a grassy terrain and onto a normal road surface such as a tarmac surface (or 'black top'), and HEV mode is assumed, the response of the vehicle to driving on the road surface will remain similar to that when the vehicle was in EV-only mode.

It is to be understood that in some embodiments, a vehicle may de-select EV-only mode and assume the HEV mode automatically responsive to one or more conditions such as a state of charge (SOC) of a battery, an amount of torque demanded by a driver and so forth. It is to be understood that if EV-only mode is de-selected automatically and the previously selected attribute mode resumed, the driver might be inconvenienced by the change in response of the vehicle to one or more control inputs (such as throttle control input) when EV-only mode is deselected.

Further optionally, the vehicle may be arranged wherein when in the HEV mode and a second or further attribute mode has been selected, selection of the EV-only mode by the driver results in assumption of the EV-only mode and automatic de-selection by the control means of the second or further attribute mode, the vehicle being operable wherein subsequent de-selection of the EV-only mode results in automatic re-selection of the second or further attribute mode that was selected prior to selection of the EV-only mode.

Still further optionally the vehicle may be arranged wherein when in the HEV mode and a second or further attribute mode has been selected, selection of the EV-only mode by the driver results in assumption of the EV-only mode, and automatic selection of the first attribute mode, the vehicle being operable wherein subsequent de-selection of the EV-only mode results in automatic re-selection of the second or further attribute mode that was selected prior to selection of the EV-only mode.

Advantageously the vehicle may be operable in the first, second or a further one or more attribute modes, the control means being operable automatically to re-select the second or further attribute modes in dependence on whether the second or further attribute mode corresponds to a prescribed set of one or more auto-re-select attribute modes.

In other words, the vehicle is operable automatically to reselect one of the second or further attribute modes that was selected before EV-only mode was selected depending on whether the previously selected attribute mode is one of a prescribed set of one or more attribute modes for which this is permitted. This feature has the advantage that in some cases a driver is not inconvenienced by a requirement to reselect the attribute mode in which the vehicle was operating when the driver selected EV-only mode.

The vehicle may be further operable in an engine-only mode in which the engine and not the at least one electric machine applies torque to the driveline.

Optionally when the engine-only mode is selected the vehicle remains in the currently selected attribute mode.

When in engine-only mode the vehicle may be operable by the driver to assume one of the first, second or further attribute modes.

Advantageously the vehicle may be operable automatically to assume a prescribed attribute mode without a requirement for the driver to select the prescribed attribute mode.

Thus the vehicle may be operable in an automatic attribute mode selection mode in which the control means is arranged automatically to control the vehicle to assume a prescribed attribute mode responsive to the detection of one or more conditions requiring assumption of a prescribed attribute mode.

Optionally the vehicle may be arranged automatically to assume a prescribed attribute mode responsive to a value of one or more vehicle operating parameters.

Optionally in the automatic attribute mode selection mode the vehicle is arranged automatically to assume a prescribed attribute mode responsive to predetermined changes in respect of a value of one or more vehicle operating parameters.

Advantageously if EV-only mode is selected when the automatic attribute mode selection mode is selected the vehicle is arranged to assume EV-only mode only if the first attribute mode has been selected automatically by the control means.

In a further aspect of the invention for which protection is sought there is provided a method of controlling a hybrid electric vehicle (HEV) having an engine and at least one electric propulsion motor,
  in a HEV mode of operation of the vehicle the method comprising controlling switching on and off of the engine automatically by control means,
  in an EV-only mode of operation of the vehicle the method comprising inhibiting starting of the engine,
  the method further comprising operating the vehicle according to one of a plurality of attribute modes in which one or more operating parameters of the vehicle are changed responsive to selection of a given attribute mode,
  whereby when in the HEV mode and a first attribute mode is selected, selection of the EV-only mode by the driver triggers the vehicle to assume the EV-only mode and continue operation in the first attribute mode, and
  whereby when in the HEV mode and a second or further attribute mode has been assumed, selection of the EV-only mode by the driver triggers the vehicle to assume the EV-only mode and automatically de-select the second or further attribute mode.

Advantageously the vehicle may be operable wherein when in the HEV mode and a second or further attribute mode has been assumed, selection of the EV-only mode by the driver triggers the vehicle to assume the EV-only mode and automatically de-select the second or further attribute mode, if the HEV mode is subsequently de-selected by the driver the method comprising the step of continuing to de-select the second or further attribute mode.

According to a further aspect of the invention for which protection is sought there is provided a method of controlling a hybrid electric vehicle (HEV) having an engine and at least one electric machine operable to deliver torque to the driveline, in a HEV mode of operation of the vehicle the method comprising applying torque to the driveline according to a required torque split between the engine and at least one electric machine responsive to a plurality of operating parameters of the vehicle, the torque split being a proportion of the total torque that is to be provided to the driveline by each of the engine and the at least one electric machine, in an EV-only mode of operation of the vehicle the method comprising inhibiting starting of the engine and employing only the at least one electric machine to deliver torque to the driveline, the method further comprising operating the vehicle according to one of a plurality of attribute modes in which one or more operating parameters of the vehicle are changed responsive to selection of a given attribute mode, whereby when in the HEV mode and a first attribute mode is selected, selection of the EV-only mode by the driver triggers the vehicle to assume the EV-only mode and continue operation in the first attribute mode, and whereby when in the HEV mode and a second or further attribute mode has been assumed, selection of the EV-only mode by the driver triggers the vehicle to assume the EV-only mode and automatically de-select the second or further attribute mode, if the HEV mode is subsequently de-selected by the driver the method comprising the step of continuing to de-select the second or further attribute mode.

According to a still further aspect of the invention for which protection is sought there is provided a control system for a hybrid electric vehicle (HEV) operable in a hybrid (HEV) mode in which motive power is provided by means of an engine and one or more electric machines and an electric (EV-only) mode in which motive power is provided by means of the at least one electric machine only, the control system being arranged to control selection of the HEV or EV modes and selection of one of a plurality of attribute modes in which one or more operating parameters of the vehicle are changed responsive to the identity of the selected attribute mode, wherein the control system is further arranged such that: when in the HEV mode and a first attribute mode is selected, selection of the EV-only mode by the driver causes the control system to select the EV-only mode and to maintain operation in the first attribute mode, and when in the HEV mode and a second or further attribute mode is selected, selection of the EV-only mode by the driver causes the control system to select the EV-only mode and to de-select the second or further attribute mode, subsequent de-selection of the EV-only mode resulting in continued de-selection of the second or further attribute mode.

According to one aspect of the invention for which protection is sought there is provided a hybrid electric vehicle (HEV) comprising: an engine and at least one electric machine; and a driveline, the engine and at least one electric machine being operable to deliver torque to the driveline, the vehicle being operable in: a HEV mode in which the vehicle is arranged to determine a required torque split between the engine and at least one electric machine responsive to a plurality of operating parameters of the vehicle, the torque split being a proportion of the total torque that is to be provided to the driveline by each of the engine and the at least one electric machine, and an EV-only mode in which engine starting is inhibited and only the at least one electric machine delivers torque to the driveline, the vehicle being operable in one of a plurality of attribute modes in which one or more operating parameters of the vehicle are changed responsive to the identity of the selected attribute mode, wherein when in the HEV mode and a first attribute mode is selected, selection of the EV-only mode by the driver results in assumption of the EV-only mode and continued operation in the first attribute mode, and when in the HEV mode and a second or further attribute mode has been selected, selection of the EV-only mode by the driver results in assumption of the EV-only mode and automatic de-selection by the vehicle of the second or further attribute mode, subsequent de-selection of the EV-only mode resulting in continued de-selection of the second or further attribute mode.

Within the scope of this application it is envisaged that the various aspects, embodiments, examples and alternatives, and particularly the individual features thereof, set out in the preceding paragraphs, in the claims and/or in the following description and drawings may be taken independently or in any combination thereof. For example, features described with reference to one embodiment are applicable to all embodiments, except where such features are incompatible.

BRIEF DESCRIPTION OF THE DRAWINGS

Embodiments of the invention will now be described, by way of example only, with reference to the accompanying figures in which:

FIG. 2 shows the special programs (SP) of the vehicle that are allowed to be run when the vehicle is normal hybrid electric vehicle (HEV) mode, electric vehicle only (EV-only) mode and hybrid inhibit mode.

DETAILED DESCRIPTION

Figure 1:
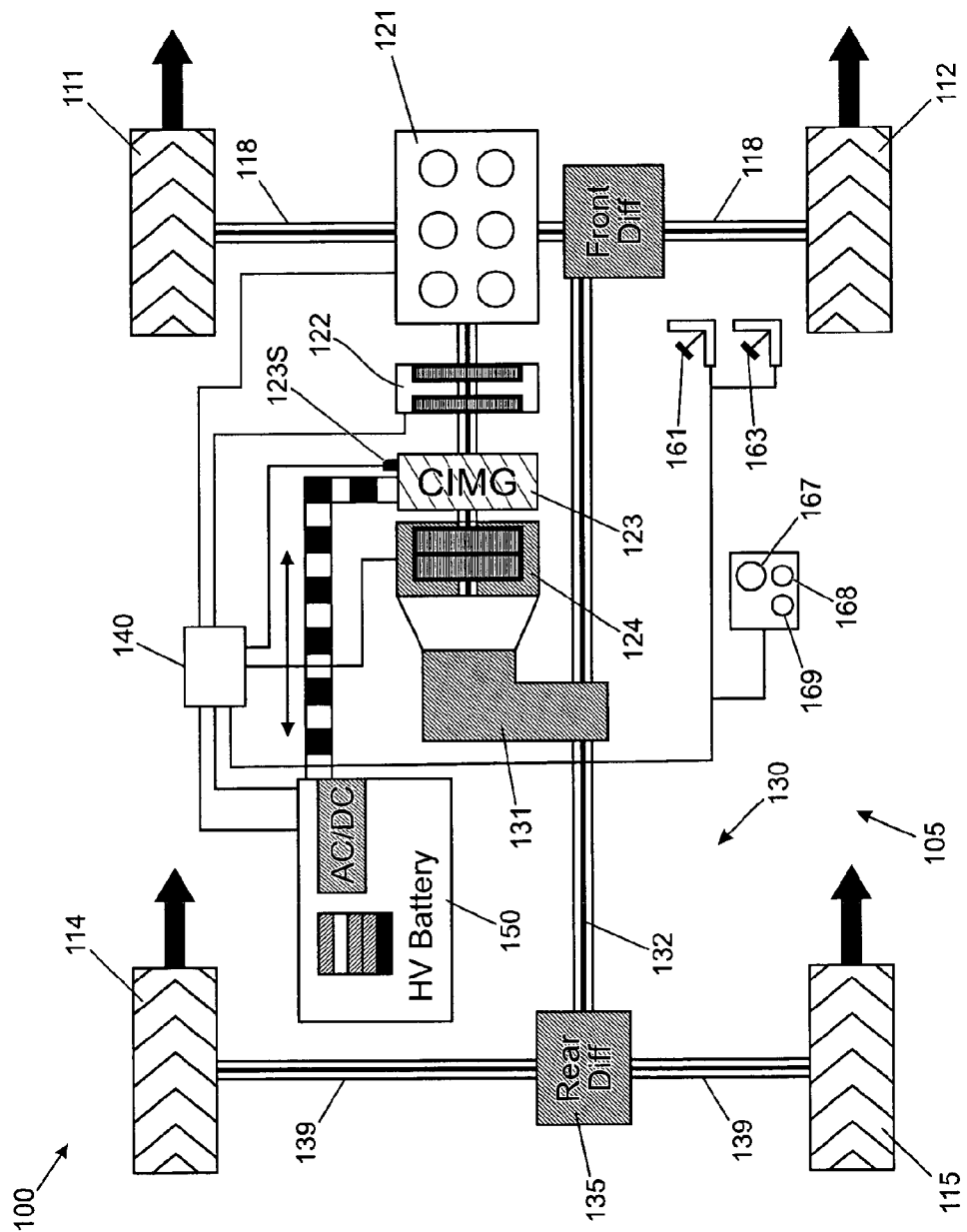
FIG. 1 is a schematic illustration of a hybrid electric vehicle according to an embodiment of the present invention.

In one embodiment of the invention a parallel-type hybrid electric vehicle (HEV) 100 is provided as shown in FIG. 1. The vehicle 100 has an internal combustion engine 121 releasably coupled to a crankshaft integrated motor/generator (CIMG) 123 by means of a clutch 122. The CIMG 123 is in turn coupled to an automatic transmission 124. The vehicle 100 is operable to provide drive torque to the transmission 124 by means of the engine 121 alone, the CIMG 123 alone or the engine 121 and CIMG 123 in parallel.

The transmission 124 is arranged to drive a pair of front wheels 111, 112 of the vehicle 100 by means of a pair of front drive shafts 118. The transmission 124 is also arranged to drive a pair of rear wheels 114, 115 by means of an auxiliary portion 130 of a driveline 105. The auxiliary portion 130 has an auxiliary driveshaft 132, a rear differential 135 and a pair of rear driveshafts 139.

It is to be understood that embodiments of the present invention are suitable for use with vehicles in which the transmission is arranged only to drive a pair of front wheels 111, 112 or only a pair of rear wheels 114, 115, i.e. front wheel drive or rear wheel drive vehicles in addition to all wheel drive or selectable two wheel drive/four wheel drive vehicles. Embodiments of the invention are also suitable for vehicles having less than four wheels or more than four wheels.

A battery 150 is coupled to the CIMG 123 in order to power the CIMG 123 when it is operated as a motor. Alternatively the battery 150 may receive charge from the CIMG 123 when the CIMG 123 is operated as a generator, thereby to recharge the battery 150.

The vehicle 100 has a brake pedal 163, an accelerator pedal 161, a transmission selector control 167 and an 'attribute mode' or 'special programs (SP)' mode selector 168.

The transmission selector control 167 is operable to select a required mode of operation of the transmission 124 selected from amongst (1) a park mode in which the transmission is disengaged from the engine 121 and a parking lock is applied lock the transmission; (2) a reverse mode in which the vehicle 100 may be driven in a reverse direction; (3) a neutral mode in which the transmission is disengaged from the engine and no parking lock is applied; (4) a drive mode in which the vehicle may be driven in a forward direction in any one of six forward gears; and (5) a low gear mode in which the vehicle 100 may be driven in a forward direction in either first or second gear as determined by a controller 140.

The vehicle 100 is configured to operate in either one of a hybrid electric vehicle (HEV) mode, a HEV inhibit mode and a driver selectable electric vehicle only (EV-only) mode according to the state of a mode selector 169.

In the HEV mode of operation the vehicle 100 is arranged to operate either in a 'parallel' mode with the engine 121 and CIMG 123 both drivably connected to the transmission 124 (i.e. clutch 122 is closed) or in a vehicle-selected EV mode. In the vehicle-selected EV mode (and in the driver selectable EV-only mode) the clutch 122 is opened and the engine 121 is switched off.

When the vehicle 100 is in the HEV mode the vehicle 100 is configured automatically to determine whether to operate with the engine 121 switched on or off. When in HEV mode and the vehicle has selected automatically to switch the engine 121 off (and operate in the vehicle-selected EV mode), restarting of the engine 121 is controlled according to a value of driver demanded torque and a state of charge (SOC) of the battery 150 although other arrangements are also useful.

If the driver selects operation of the vehicle 100 in EV-only mode and the engine 121 is running, the vehicle 100 is configured to open the clutch 122 and to switch off the engine 121. Again, the CIMG 123 is then operated either as a motor or as a generator. It is to be understood that the CIMG 123 may be arranged to act as a generator in the EV-only mode in order to effect regenerative braking of the vehicle 100.

The controller 140 is arranged to control the vehicle 100 to switch the engine 121 on and off when in HEV mode responsive to a variety of parameters associated with the vehicle 100 and driver actions that will not be discussed in detail herein.

If the mode selector 169 is set to select EV-only mode the vehicle 100 is arranged to operate in the EV-only mode provided certain prescribed criteria are met. These include the requirements that (1) the battery state of charge SoC is above a prescribed threshold value; and (2) the value of driver demanded torque is below a prescribed threshold value. In the present embodiment the value of driver demanded torque is determined by the controller 140 based on engine speed and an amount by which the accelerator pedal 163 is depressed although other arrangements are also useful.

The controller 140 is also arranged to control the vehicle 100 according to one of six attribute modes responsive to the state of the attribute mode selector 168.

The first attribute mode is a 'baseline' or 'default' mode. The five further attribute modes are arranged to change one or more attributes of the vehicle relative to the baseline mode in order to optimise performance of the vehicle 100 for a particular driving condition. Operation in one of these five further modes may be referred to as operation in a 'special programs' or 'SP' mode. Operation in the baseline mode may be referred to as a 'special programs off' or 'SPO' mode.

The five further attribute modes are (1) a dynamic mode; (2) a 'grass/gravel/snow' mode; (3) a 'mud/ruts' mode; (4) a 'sand' mode; and (5) a rock crawl mode.

In the dynamic mode automatic shut-down of the engine 121 according to a stop/start mode of operation is inhibited throughout a drive cycle even when the vehicle 100 is stationary. Furthermore when dynamic mode is selected whilst in HEV mode, the vehicle 100 is prevented from switching off the engine 121 during the course of the drive cycle.

In some embodiments, when the dynamic mode is selected the vehicle is arranged to select a set of throttle maps corresponding to dynamic mode that are different from those selected in the baseline or default mode. The throttle maps employed in the dynamic mode are arranged to result in increased amounts of torque developed by the engine 121 for a given amount of depression of the accelerator pedal 161.

Furthermore, in the case that the vehicle has an automatic transmission 124, in the dynamic mode the vehicle is arranged to change a relationship between vehicle speed, accelerator pedal position and gear that is required to be selected by the transmission 124 in order to provide enhanced responsiveness of the vehicle to accelerator pedal control inputs. This feature is implemented by changing the gear shift maps provided to the transmission 124. The gear shift map(s) are employed by the transmission 124 to determine when the transmission 124 is required to shift up a gear or shift down a gear.

In some embodiments, in the dynamic mode the vehicle is configured such that the transmission 124 will typically spend longer in a gear that maintains the engine 121 in a speed range allowing a higher amount of torque to be developed than it would otherwise do so, typically a higher speed range.

In the 'grass/gravel/snow' mode throttle maps of the vehicle 100 are modified such that the amount of torque delivered by the engine for a given amount of depression of the accelerator pedal 163 is reduced relative to operation in the baseline mode. The accelerator pedal 163 may be described as being 'softened' in this mode. The purpose of the softening is to reduce the risk of wheel slip occurring when a driver depresses the accelerator pedal whilst the vehicle is operating on a grass, gravel or snow-covered surface.

In contrast, in the 'sand' mode of operation the throttle maps of the vehicle 100 may be modified such that the amount of torque delivered for a given amount of depression of the accelerator pedal 163 is increased relative to the baseline mode. The accelerator pedal 163 may be described as being 'hardened' in this mode. The purpose of hardening is to improve handling of the vehicle 100 when operating on a sandy surface.

In the present embodiment, the vehicle 100 is arranged whereby if the driver is operating in the HEV mode with the first (baseline) attribute mode selected and the driver selects the EV-only mode, the vehicle 100 continues operating in the baseline attribute mode. Provided conditions are met for the EV-only mode to be assumed (see above) the vehicle 100 assumes the EV-only mode and remains in the baseline attribute mode.

If the EV-only mode is subsequently de-selected by the driver the vehicle 100 is configured to assume the HEV mode of operation and to remain in the baseline attribute mode.

If the vehicle is operating in HEV mode with an SP mode selected and the driver selects the EV-only mode, the vehicle 100 determines whether EV-only mode is permitted to be assumed based on one or more vehicle parameters such as battery SoC and driver demanded torque. If EV-only mode is permitted, the vehicle 100 de-selects the SP mode and assumes the baseline attribute mode. The vehicle 100 then assumes the EV-only mode.

If EV-only mode is subsequently de-selected (either by the driver by means of the mode selector 169 or automatically by the vehicle 100 if conditions for maintaining EV-only mode are no longer met) the vehicle 100 resumes operation in the HEV mode. The vehicle 100 also remains in the baseline attribute mode.

Thus, if the vehicle 100 was operating in HEV mode in a given SP mode prior to selection of EV-only mode by the driver, when EV-only mode is de-selected by the driver (or automatically by the vehicle 100 as described above) the vehicle 100 does not resume operation in the SP mode that was selected prior to selection of EV-only mode.

The purpose of not assuming the previously selected SP mode is to prevent a sudden change in one or more vehicle attributes when EV-only mode is de-selected. A risk that a driver is inconvenienced by a change in one or more vehicle attributes when EV-only mode is de-selected is therefore reduced, particularly if the vehicle de-selects EV-only mode automatically.

For example, it is to be understood that if the vehicle is operating in the HEV mode on a sandy surface with the 'sand' attribute mode selected, the torque developed by the engine 121 for a given amount of throttle pedal depression will be relatively large compared with the baseline attribute mode.

It the driver then selects the EV-only mode (for example in order to avoid disturbing wildlife), the vehicle assumes automatically the baseline attribute mode and the EV-only mode. The response of the engine 121 to depression of the accelerator pedal 163 is then 'softened' as described above.

If the vehicle 100 subsequently leaves the sandy surface and drives on a concrete surface, the vehicle may continue operating in the baseline attribute mode in the EV-only mode until the vehicle determines that EV-only mode must be de-selected, for example if the battery SoC is falls below a prescribed threshold or the driver demanded torque exceeds a prescribed threshold. The vehicle 100 may then automatically de-select the EV-only mode and assume the HEV mode.

If the vehicle were to resume the sand attribute mode when de-selecting EV-only mode the driver may be inconvenienced by the resulting hardening of the accelerator pedal response.

In some embodiments the vehicle 100 also has a 'hybrid inhibit' selector allowing a 'hybrid inhibit' mode to be assumed when in HEV mode. In the hybrid inhibit mode engine shutdown is prohibited.

If the vehicle 100 is operating in the HEV mode and 'hybrid inhibit' mode is selected, the vehicle remains in the selected attribute mode and inhibits engine shutdown. Any one of the six attribute modes may be selected with the vehicle 100 in the 'hybrid inhibit' mode, the vehicle 100 remaining in the hybrid inhibit mode until the hybrid inhibit mode is de-selected.

In the present embodiment the vehicle 100 is operable by the driver to assume an 'automatic terrain response' (ATR) mode in which the vehicle 100 is configured automatically to determine which of the six attribute modes should be selected at a given moment in time. This is in contrast to the 'user-selected terrain response mode' described above in which the user selects the desired attribute mode such as one of the SP modes or the SPO mode.

In some embodiments the vehicle 100 determines automatically which attribute mode to assume by monitoring one or more operating parameters of the vehicle. In some embodiments the vehicle monitors a suspension of the vehicle 100 to determine an amount of movement of a body of the vehicle 100 relative to the wheels 111, 112, 114, 115. The vehicle 100 may alternatively or in addition monitor an amount of lateral acceleration and/or longitudinal acceleration of the vehicle 100 and/or a value of one or more other vehicle operating parameters.

When ATR mode is selected the vehicle 100 is configured not to assume EV-only mode when request by a driver unless the vehicle 100 has selected operation in the first attribute mode (SPO).

Thus if the vehicle 100 is in the ATR mode and the vehicle 100 has selected automatically the 'grass/gravel/snow' mode, an attempt by the driver to select operation in EV-only mode will be refused by the vehicle 100. Thus the vehicle 100 will remain in the 'grass/gravel/snow' mode even if the driver has selected or attempted to select the EV-only mode.

If the driver selects EV-only mode whilst in ATR mode and the SPO mode has been selected automatically by the vehicle 100, the vehicle 100 is configured to assume the EV-only mode. If the vehicle 100 subsequently determines that an SP mode of operation is required, in some embodiments the vehicle 100 is configured to de-select EV-only mode and to select the required SP mode.

It is to be understood that if the ATR mode is selected by the driver, it is considered that the driver is entrusting selection of an appropriate attribute mode to the vehicle. Thus, since the vehicle 100 is configured to not operate in EV-only mode when in a SP mode, when in ATR mode and an SP mode has been selected automatically by the vehicle 100 a request by the driver to assume EV-only mode will be refused.

As noted above, embodiments of the invention have the advantage that vehicle operations may be conducted in a manner that reduces a risk that a driver is inconvenienced by changes in attribute mode responsive to selection and de-selection of an EV-only mode. Furthermore, as noted above, in the non-ATR mode the vehicle 100 is arranged to de-select an SP mode if EV-only mode is selected by the driver thereby ensuring reproducible operational characteristics of the vehicle 100 when in EV-only mode. In contrast, when in ATR mode the vehicle 100 is arranged to inhibit selection of EV-only mode when an SP mode has been selected by the vehicle 100, thereby ensuring the vehicle 100 remains in the attribute mode the vehicle 100 has determined to be most appropriate under a given set of driving conditions.

It is to be understood that in some alternative embodiments, if a vehicle is not in an ATR mode (or is not equipped with an ATR mode) and an SP mode has been selected, the vehicle may be arranged to assume EV mode (and deselect SP mode, i.e. select SPO mode) when the driver selects EV-only mode. When EV-only mode is subsequently de-selected the vehicle may be arranged to resume the previously selected SP mode.

In some embodiments the vehicle may arranged to resume the previously selected SP mode only if the SP mode previously selected was one of a prescribed set of one or more SP modes.

Thus, whether or not a vehicle will resume operation in a previously selected SP mode may depend on the identity of the SP mode. In one embodiment, if the vehicle is in a SP mode in which throttle response has been hardened prior to selection of EV-only mode, the vehicle is configured not to resume operation in that mode automatically when EV-only mode is exited. Other arrangements are also useful.

In some embodiments a HEV may be arranged to disallow driver-selected EV mode when in a low ratio gear mode or low range mode. This is because selection of low range mode is indicative that the vehicle may be operating in difficult conditions. Discontinuities or disturbances in torque delivery (for example due to a change in throttle map or other powertrain-related configuration) may therefore be undesirable.

In some embodiments a HEV may be arranged to disallow driver-selected EV mode when a ride-height of the vehicle has been set to an off-road or raised ride height. Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A hybrid electric vehicle (HEV) comprising:
an engine, at least one electric propulsion motor, an accelerator, and a controller, the vehicle being operable in an HEV mode in which the engine is configured to be switched on automatically by the controller and an electric vehicle (EV)-only mode in which engine starting is inhibited,
the vehicle being operable in one of a plurality of attribute modes selected by a driver, in which one or more operating parameters of the vehicle are changed by the controller responsive to an identity of a currently selected attribute mode, the attribute modes including at least one terrain response mode, wherein
when in the HEV mode and a first attribute mode has been selected, selection of the EV-only mode by the driver results in assumption of the EV-only mode and continued operation in the first attribute mode, and
when in the HEV mode and a second or further attribute mode has been selected, selection of the EV-only mode by the driver results in assumption of the EV-only mode and automatic de-selection by the controller of the second or further attribute mode.

2. The vehicle of claim 1, wherein when in the HEV mode and the second or further attribute mode has been assumed, selection of the EV-only mode by the driver results in assumption of the EV-only mode, automatic de-selection of the second or further attribute mode and assumption of the first attribute mode.

3. The vehicle of claim 1, wherein when in the EV-only mode and the driver selects an attribute mode other than the first attribute mode the controller is arranged automatically to de-select the EV-only mode and to assume the attribute mode selected by the driver.

4. The vehicle of claim 3, wherein when in the EV-only mode and the driver selects the second or further attribute mode the controller is arranged automatically to de-select the EV-only mode, select the HEV mode and assume an attribute mode selected by the driver.

5. The vehicle of claim 1, wherein when in the HEV mode and the second or further attribute mode has been selected, selection of the EV-only mode by the driver results in assumption of the EV-only mode and automatic de-selection by the controller of the second or further attribute mode, the vehicle being operable wherein subsequent de-selection of the EV-only mode results in continued de-selection of the second or further attribute mode.

6. The vehicle of claim 5, wherein when in the HEV mode and the second or further attribute mode has been selected, selection of the EV-only mode by the driver results in assumption of the EV-only mode and automatic selection of the first attribute mode, the vehicle being operable wherein subsequent de-selection of the EV-only mode results in continued selection of the first attribute mode.

7. The vehicle of claim 1, wherein when in the HEV mode and the second or further attribute mode has been selected, selection of the EV-only mode by the driver results in assumption of the EV-only mode and automatic de-selection by the controller of the second or further attribute mode, the vehicle being operable wherein subsequent de-selection of the EV-only mode results in automatic re-selection of the second or further attribute mode that was selected prior to selection of the EV-only mode.

8. The vehicle of claim 7, wherein when in the HEV mode and the second or further attribute mode has been selected, selection of the EV-only mode by the driver results in assumption of the EV-only mode, and automatic selection of the first attribute mode, the vehicle being operable wherein subsequent de-selection of the EV-only mode results in automatic re-selection of the second or further attribute mode that was selected prior to selection of the EV-only mode.

9. The vehicle of claim 1, wherein, when in the HEV mode and the second or further attribute mode has been selected, selection of the EV-only mode by the driver results in assumption of the EV-only mode and automatic de-selection by the controller of the second or further attribute mode, the controller being operable automatically to re-select the second or further attribute mode in dependence on whether the second or further attribute mode corresponds to a prescribed set of one or more auto-re-select attribute modes.

10. The vehicle of claim 1, further operable in an engine-only mode in which the engine and not the at least one electric propulsion motor applies drive torque to the driveline.

11. The vehicle of claim 10, wherein when the engine-only mode is selected the vehicle remains in the currently selected attribute mode.

12. The vehicle of claim 10, wherein when in engine-only mode the vehicle is operable by the driver to assume one of the first, second or further attribute modes.

13. The vehicle of claim 1, wherein the vehicle is operable automatically to assume a prescribed attribute mode without a requirement for the driver to select the prescribed attribute mode.

14. The vehicle of claim 1, wherein the vehicle is operable in an automatic attribute mode selection mode in which the controller is arranged automatically to control the vehicle to assume a prescribed attribute mode responsive to detection of one or more conditions requiring assumption of the prescribed attribute mode.

15. The vehicle of claim 14, wherein the vehicle is arranged automatically to assume the prescribed attribute mode responsive to a value of one or more vehicle operating parameters.

16. The vehicle of claim 15, wherein in the automatic attribute mode selection mode the vehicle is arranged automatically to assume the prescribed attribute mode responsive to predetermined changes in respect of the value of the one or more vehicle operating parameters.

17. The vehicle of claim 14, wherein, if EV-only mode is selected when the automatic attribute mode selection mode has been selected, the vehicle is arranged to assume EV-only mode only if the first attribute mode has been selected automatically by the controller.

18. A method of controlling a hybrid electric vehicle (HEV) having an engine and at least one electric propulsion motor, and being driven by a driver,
    in an HEV mode of operation of the vehicle, the method comprising controlling switching on and off of the engine automatically by a controller,
    in an EV-only mode of operation of the vehicle, the method comprising inhibiting starting of the engine,
    the method further comprising operating the vehicle according to one of a plurality of attribute modes in which one or more operating parameters of the vehicle are changed responsive to selection of a given attribute mode by the driver, the attribute modes including at least one terrain response mode,
    wherein, when in the HEV mode and a first attribute mode has been selected, selection of the EV-only mode by the driver triggers the vehicle to assume the EV-only mode and continue operation in the first attribute mode, and
    wherein, when in the HEV mode and a second or further attribute mode has been assumed, selection of the EV-only mode by the driver triggers the vehicle to assume the EV only mode and automatically de-select the second or further attribute mode.

19. The method of claim 18, wherein, when in the HEV mode and the second or further attribute mode has been assumed, selection of the EV-only mode by the driver results in a step of controlling the vehicle to assume the EV-only mode and automatically de-select the second or further attribute mode, and if the EV-only mode is subsequently de-selected by the driver the method comprises continuing to de-select the second or further attribute mode.

* * * * *

UNITED STATES PATENT AND TRADEMARK OFFICE
CERTIFICATE OF CORRECTION

PATENT NO.        : 9,150,215 B2                                         Page 1 of 1
APPLICATION NO.   : 14/113967
DATED             : October 6, 2015
INVENTOR(S)       : Berry et al.

It is certified that error appears in the above-identified patent and that said Letters Patent is hereby corrected as shown below:

In the Claims:
Column 14, Claim 18, Line 44: Please correct "the EV only mode"
                              to read -- the EV-only mode --

Signed and Sealed this
Twenty-second Day of March, 2016

Michelle K. Lee
*Director of the United States Patent and Trademark Office*